US012618371B2

(12) United States Patent　　(10) Patent No.:　US 12,618,371 B2
Maalouf et al.　　　　　　　　　(45) Date of Patent:　　　May 5, 2026

(54) FUEL CONDITIONING SYSTEM FOR SUPPLYING AN AIRCRAFT TURBINE ENGINE, AND METHOD OF SUPPLYING A TURBINE ENGINE

(71) Applicant: SAFRAN, Paris (FR)

(72) Inventors: Samer Maalouf, Moissy-Cramayel (FR); Cyrille Marie Pierre-Alain Lambert, Moissy-Cramayel (FR)

(73) Assignee: SAFRAN, Paris (FR)

( * ) Notice: Subject to any disclaimer, the term of this patent is extended or adjusted under 35 U.S.C. 154(b) by 15 days.

(21) Appl. No.: 18/858,428

(22) PCT Filed: Apr. 25, 2023

(86) PCT No.: PCT/EP2023/060727
§ 371 (c)(1),
(2) Date: Oct. 21, 2024

(87) PCT Pub. No.: WO2023/208884
PCT Pub. Date: Nov. 2, 2023

(65) Prior Publication Data
US 2025/0270958 A1　　Aug. 28, 2025

(30) Foreign Application Priority Data
Apr. 26, 2022　(FR) ..................................... 2203898

(51) Int. Cl.
*F02C 7/224*　　　(2006.01)
*F02C 3/22*　　　(2006.01)
*F02C 7/236*　　　(2006.01)
(52) U.S. Cl.
CPC ............... *F02C 7/224* (2013.01); *F02C 3/22* (2013.01); *F02C 7/236* (2013.01); *F05D 2220/323* (2013.01); *F05D 2260/213* (2013.01)

(58) Field of Classification Search
CPC .. F02C 7/224; F02C 3/22; F02C 7/236; F05D 2220/323; F05D 2260/213
See application file for complete search history.

(56) References Cited

U.S. PATENT DOCUMENTS 4,041,697 A　*　8/1977　Coffinberry ............... F02C 7/14
　　　　　　　　　　　　　　　　　　　　　60/39.83
4,696,156 A　*　9/1987　Burr ....................... B64D 37/34
　　　　　　　　　　　　　　　　　　　　　60/39.08

(Continued)

FOREIGN PATENT DOCUMENTS

FR　　　2503256 A1　10/1982
FR　　　3110938 A1　12/2021
GB　　　1392783 A　　4/1975

OTHER PUBLICATIONS

French Search Report for French Patent Application FR2203898 (dated Dec. 8, 2022).

*Primary Examiner* — Rodolphe Andre Chabreyrie
(74) *Attorney, Agent, or Firm* — Alumen IP Law PC

(57) ABSTRACT

The invention relates to a conditioning system (SC) for fuel (Q), which is configured to supply an aircraft turbine engine (M) with fuel (Q) from a cryogenic tank (R), the conditioning system (SC) comprising at least one first heat exchanger (31) configured to heat the flow of fuel (Q) to a circulation temperature (Te), at least one second heat exchanger (32) configured to heat the flow of fuel (Q) to an injection temperature (Ti), a distribution valve (4) configured to divide a direct fuel flow (Q1) and a recirculated fuel flow (Q2), configured to circulate in a recirculation branch (12) so as to reheat the main fuel flow (Qp) in the first heat exchanger (31) by means of the recirculated fuel flow (Q2).

11 Claims, 4 Drawing Sheets

(56) References Cited

U.S. PATENT DOCUMENTS

| | | | | |
|---|---|---|---|---|
| 12,006,878 B2* | 6/2024 | Brady | .................... | F02C 7/143 |
| 2010/0107603 A1* | 5/2010 | Smith | .................... | F02C 7/224 |
| | | | | 701/100 |
| 2010/0242431 A1* | 9/2010 | Baker | .................... | F02C 7/232 |
| | | | | 417/278 |
| 2012/0234014 A1* | 9/2012 | Reuter | .................... | F02C 9/263 |
| | | | | 60/773 |
| 2016/0281656 A1* | 9/2016 | Alecu | .................... | F02C 7/236 |
| 2020/0025081 A1* | 1/2020 | Dyer | .................... | F02C 7/236 |

* cited by examiner

FUEL CONDITIONING SYSTEM FOR SUPPLYING AN AIRCRAFT TURBINE ENGINE, AND METHOD OF SUPPLYING A TURBINE ENGINE

TECHNICAL FIELD

This invention relates to the field of aircrafts comprising turbine engines supplied by fuel stored in a cryogenic tank.

It is known to store fuel, in particular hydrogen, in liquid form to limit the overall dimension and the weight of the tanks of the aircraft. For example, the fuel is stored at a temperature of around −253 to −251° C. (20 to 22 Kelvin) in a cryogenic tank on the aircraft.

In order to be injected into the combustion chamber of a turbine engine, the fuel must be conditioned, i.e. pressurized and heated, to allow an optimum combustion. A conditioning is required, for example, to reduce the risk of icing/solidification of the water vapor contained in the air circulating in the turbine engine, particularly at the level of the fuel injectors of the turbine engine.

With reference to FIG. 1, it is represented a conditioning system SCAA according to the prior art, comprising a fuel circuit 100 connected at the inlet to a cryogenic tank R and at the outlet to the combustion chamber of a turbine engine M. In known manner, the cryogenic tank R belongs to an aircraft reference frame REF-A, while the turbine engine M belongs to a turbine engine reference frame REF-M. A fuel flow Q circulating from upstream to downstream in the fuel circuit 100 passes successively through a mechanical pump 101 and a heating module 102.

The mechanical pump 101 is configured to circulate the fuel flow Q in the fuel circuit 100. The heating module 102 is configured to add calories to the fuel flow Q to warm it so that it may be injected into the turbine engine M.

In practice, the fuel heating step requires calories to be collected from hot sources on the aircraft. For example, the heat generated by the turbine engine may be used (heat from lubricating oil, turbine outlet calories, nozzle heat, etc.). Heat from the aircraft may also be used (cabin air, heat from electrical or electronic systems, etc.).

For example, the patent application FR2005628A1 describes an architecture, also shown in [FIG. 1], wherein a heat transfer fluid F passes through a heat exchanger EX wherein it extracts the calories from the hot sources C available on board the aircraft and is then conveyed via a circulation loop BC towards the heat module 102, in order to heat the fuel Q. This circulation loop BC for the heat transfer fluid F allows to avoid the risk of contamination between the fuel and an oxidant in a heat exchanger, for example.

However, such an architecture requires the addition of a recirculation pump PR, which significantly increases the weight of the aircraft. In addition, the architecture has a high thermal inertia, which means that the fuel takes a long time to heat up. The temperature of the heat transfer fluid F in the circulation loop BC must also follow a predefined variation range. In fact, the temperature T at the inlet of the turbine engine reference frame REF-M must be higher than a predetermined minimum temperature Tmin to avoid any risk of icing of the hot sources C by the heat transfer fluid F. On the other hand, at the inlet of the aircraft reference frame REF-A, i.e. at the outlet of the turbine engine reference frame REF-M, the temperature T must be lower than a predetermined maximum temperature Tmax in order to comply with the aircraft manufacturer's rules so that the heat transfer fluid F may be conveyed in complete safety as close as possible to the tank R. Limiting the temperature range in this way leads to an increase in the flow rate of the heat transfer fluid in the circulation loop, which in turn leads to an increase in the circulation volume and therefore the use of more bulky and heavier piping, which is undesirable in an aeronautical context where the aim is to reduce aircraft weight.

The invention therefore aims to eliminate at least some of these disadvantages by providing a new fuel conditioning system for heating that is efficient and reliable. In particular, the conditioning system aims to limit the mass and overall dimension of the circulation pipes of the fluids, while ensuring that the hot source that heats the fuel does not freeze.

SUMMARY

The invention relates to a fuel conditioning system configured to supply an aircraft turbine engine with fuel from a cryogenic tank, the conditioning system being defined in an aircraft reference frame and a turbine engine reference frame, the cryogenic tank extending in the aircraft reference frame and the turbine engine extending in the turbine engine reference frame, the conditioning system comprising:

a fuel circuit connected at the inlet to the cryogenic tank and at the outlet to the turbine engine, a main fuel flow circulating from upstream to downstream in the fuel circuit, at least one first mechanical pump mounted on the fuel circuit in the aircraft reference frame, the first pump being configured to raise the pressure of the main fuel flow in the fuel circuit to a first pressure, at least a first heat exchanger mounted downstream of the first mechanical pump, the first heat exchanger being configured to heat the main fuel flow to a circulation temperature, the first heat exchanger being mounted in the aircraft reference frame, the first heat exchanger comprising a fuel inlet, at least one second mechanical pump, mounted on the fuel circuit between the first mechanical pump and the first heat exchanger, the second mechanical pump being configured to circulate the main fuel flow from the cryogenic tank from upstream and downstream in the fuel circuit, the second mechanical pump being configured to raise the pressure of the main fuel flow in the fuel circuit to a second pressure higher than the first pressure, at least one second heat exchanger configured to heat the main fuel flow to at least one injection temperature, the injection temperature being higher than the circulation temperature, the second heat exchanger being mounted in the turbine engine reference frame.

The conditioning system is remarkable in that it comprises a distribution valve mounted on the fuel circuit downstream of the first heat exchanger in the turbine engine reference frame, the distribution valve being configured to divide the fuel circuit into:

a supply branch mounted between the distribution valve and the turbine engine, and a recirculation branch mounted between the distribution valve and the fuel inlet of the first heat exchanger via said first heat exchanger, the distribution valve being configured to divide the main fuel flow into a direct fuel flow configured to circulate in the supply branch and supply the turbine engine, and a recirculated fuel flow configured to circulate in the recirculation branch so as to warm the main fuel flow in the first heat exchanger to the circulation temperature by means of the recirculated fuel flow at a temperature greater than or equal to the injection temperature.

Advantageously, the conditioning system according to the invention allows the main fuel flow to be warmed from a portion of the same fuel flow. More specifically, thanks to the distribution valve, the conditioning system according to the invention allows to recirculate only a fraction of the fuel flow heated by the first heat exchanger, while allowing a second portion of the fuel flow to be conveyed directly to the turbine engine. The fuel flow in the liquid state leaving the cryogenic tank may be heated in the aircraft reference frame before being conveyed to the turbine engine, which allows to eliminate the need to install special fuel circulation ducts between the aircraft reference frame and the turbine engine reference frame that would require specific insulation to circulate a cryogenic fuel flow.

The first mechanical pump raises the pressure of the fuel flow sufficiently for it to undergo sub-cooling, which advantageously means that it is not at liquid saturation at the inlet of the second mechanical pump, as was the case at the tank outlet, thus avoiding any risk of damage to the second mechanical pump, corresponding to the main pump.

In one embodiment, the distribution valve is mounted downstream of the second heat exchanger to allow both the recirculated fuel flow to be conveyed directly out of the distribution valve to warm the main fuel flow and the direct fuel flow to be conveyed directly towards the turbine engine.

Alternatively, the distribution valve is mounted directly downstream of the first heat exchanger, in particular upstream of the second heat exchanger. This type of embodiment allows to adjust the temperatures in the supply branch and the recirculation branch independently.

Preferably, the direct fuel flow circulating in the supply branch has a first flow rate, and the recirculated fuel flow circulating in the recirculation branch has a second flow rate of between 5% and 25% of the first flow rate of the direct fuel flow. Advantageously, a large portion of the fuel flow is conveyed directly to the turbine engine to supply it, which allows to provide an efficient conditioning system, while avoiding the use of long cryogenic ducts between the aircraft reference frame and the engine reference frame.

In a preferred embodiment, the first pressure of the fuel flow allowing the temperature of said fuel flow to be raised to a primary temperature, the fuel flow having a saturation temperature at the first pressure, the primary temperature is lower than the saturation temperature at the first pressure. Such a temperature at the same pressure allows the compressed fuel flow to be sub-cooled, which ensures that the fuel is in a liquid state when it leaves the mechanical pump. Thanks to this type of embodiment, the main fuel flow is mixed with the recirculated fuel flow in a liquid state, which advantageously allows to limit any risk of damage to the second mechanical pump.

In one embodiment, the conditioning system comprises a third heat exchanger mounted on the recirculation branch between the redistribution valve and the first heat exchanger, so as to increase the temperature of the recirculated fuel flow above the injection temperature, the third heat exchanger being mounted in the turbine engine reference frame.

In one embodiment, the conditioning system comprises an expansion valve mounted on the recirculation branch between the first heat exchanger and the first mechanical pump, so that the recirculated fuel flow circulating in the recirculation branch has a pressure similar to the pressure of the fuel flow on the fuel circuit between the first mechanical pump and the first heat exchanger. The expansion valve allows the fuel flow to be expanded to the first outlet pressure of the first mechanical pump so that the recirculated fuel flow may be mixed with the main fuel flow from the cryogenic tank, the recirculated fuel flow being liquid.

Preferably, the expansion valve is an isenthalpic Joule-Thomson expansion valve.

In one embodiment, the fuel circuit between the first heat exchanger and the second heat exchanger comprises a first duct for circulation of the main fuel flow and a second duct for circulation of the recirculated fuel flow, the first duct and the second duct each being in the form of a cylinder, the first duct and the second duct being concentric, the second duct extending radially outwards from the first duct, so as to warm the main fuel flow at the outlet of the first heat exchanger by the recirculated fuel flow.

Advantageously, such a double-walled pipe allows optimum heat exchange between the cold main fuel flow and the hot recirculated fuel flow. In addition, a double-walled tubular configuration allows to eliminate the risk of leakage of the cold fuel flow. In the event of damage to the fuel circuit, the cold fuel flow circulating through the first duct ends up in the second duct.

A double-walled pipe also allows to reduce the size of the first heat exchanger by continuing to heat the main fuel flow after it leaves the first heat exchanger. In one embodiment, such a configuration allows to limit the use of the first heat exchanger during certain phases of the flight, when the need for fuel is less important, for example when the aircraft is slowing down.

Preferably, the main fuel flow in the first duct and the recirculated fuel flow in the second duct circulate in opposite directions.

Preferably, the surfaces of the first duct, internal to the second duct, comprise grooves or fins to promote the heat exchange between the two flows of fuel.

In one embodiment, the external wall of the second duct comprises multi-layer insulation to minimize heat loss to the environment.

In one embodiment, the fuel circuit comprises a third duct, the third duct being mounted radially outwardly of the second duct so as to allow leakage of the recirculated fuel flow and/or the main fuel flow to be detected.

In one embodiment, the fuel circuit comprises an intermediate duct, the intermediate duct being mounted between the first duct and the second duct, the intermediate duct being substantially evacuated, so as to allow the detection of leaks in the initial fuel flow and/or the recirculated fuel flow.

Preferably, the exchange surfaces between the first duct, respectively the second duct, and the intermediate duct comprise fins, advantageously making it easy to detect a leak between the two flows while ensuring heat exchange between the hot fuel flow and the cold fuel flow.

In one embodiment, the conditioning system comprises a third mechanical pump, mounted on the recirculation branch, the third pump being configured to circulate the recirculated fuel flow in the recirculation branch from the distribution valve to the fuel circuit. Such a third mechanical pump allows the recirculated fuel flow to be reinjected into the fuel circuit downstream of the second pump.

The invention also relates to an aircraft comprising a cryogenic tank, a turbine engine and a conditioning system as described above.

Finally, the invention relates to a method for supplying fuel to an aircraft turbine engine from fuel coming from a cryogenic tank by means of a conditioning system as described above, a fuel flow circulating from upstream to downstream in the fuel circuit connecting the cryogenic tank at the inlet and the turbine engine at the outlet, the method comprising steps consisting in:

Heating the main fuel flow, in the first heat exchanger in the aircraft reference frame, to at least the circulation temperature, Conveying the main fuel flow towards the turbine engine reference frame, Dividing the main fuel flow into a direct fuel flow and a recirculated fuel flow, Directing the recirculated fuel flow towards the first heat exchanger, so that the first heat exchanger collects calories from the recirculated fuel flow having at least the injection temperature to warm the main fuel flow up to the circulation temperature.

BRIEF DESCRIPTION OF THE DRAWINGS

The invention will be better understood on reading the following description, given by way of example, with reference to the following figures, given by way of non-limiting examples, wherein identical references are given to similar objects.

It should be noted that the figures set out the invention in detail in order to implement the invention, said figures of course being able to be used to better define the invention if necessary.

DETAILED DESCRIPTION

Figures 1, 2:
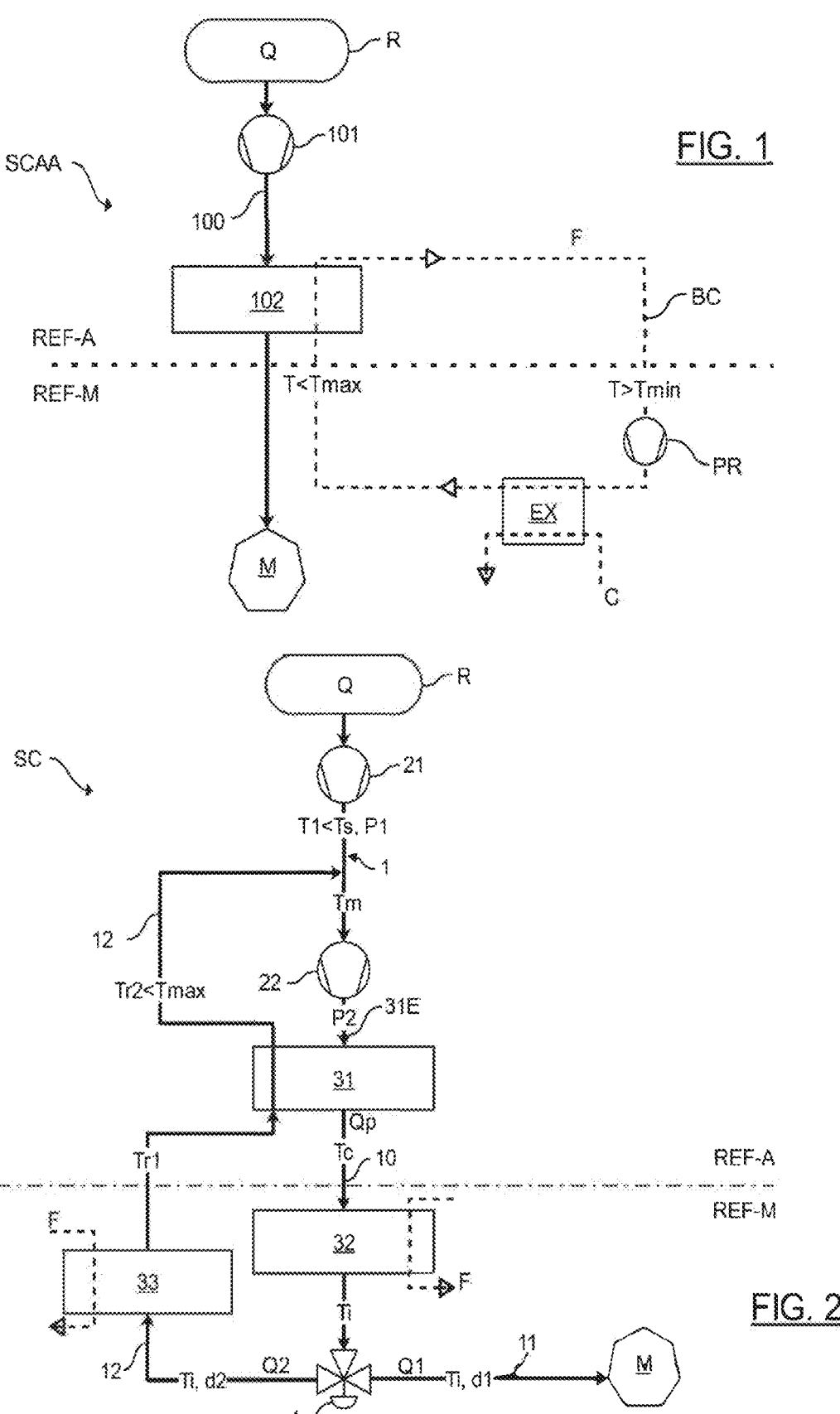
FIG. 1 is a schematic representation of a conditioning system according to the prior art.
FIG. 2 is a schematic representation of a conditioning system according to one embodiment of the invention.

With reference to FIG. 2, a fuel conditioning system SC is shown, configured to supply an aircraft turbine engine M with fuel Q from a cryogenic tank R. The turbine engine M is configured to ensure the propulsion of the aircraft, in particular by driving at least one propulsion member (not shown in FIG. 2). In this example, the fuel Q is liquid hydrogen, but the invention is applicable to other types of fuel, for example liquid methane or liquefied natural gas.

In this example, the fuel Q in the cryogenic tank R is stored at a temperature of around −253 to −251° C. (20 to 22 Kelvin). At this temperature, the fuel flow Q is liquid.

The conditioning system SC is defined in an aircraft reference frame REF-A and in a turbine engine reference frame REF-M. The cryogenic tank R extends in the aircraft reference frame REF-A, while the turbine engine M extends in the turbine engine reference frame REF-M.

With reference to FIG. 2, the conditioning system SC according to the invention comprises a fuel circuit 1 (solid line in FIG. 2) connected at the inlet to the cryogenic tank R and at the outlet to the turbine engine M. A fuel flow Q circulates from upstream to downstream in the fuel circuit 1. Hereafter, the terms "upstream" and "downstream" are defined in relation to the direction of flow of the fuel flow Q from upstream to downstream.

According to the invention, the conditioning system SC comprises a first mechanical pump 21, preferably a high-pressure pump. The first mechanical pump 21 is preferably mounted in the aircraft reference frame REF-A, i.e. as close as possible to the cryogenic tank R.

The first mechanical pump 21 is configured to raise the pressure of the fuel flow Q coming from the cryogenic tank R in the fuel circuit 1 to a first pressure P1 allowing the temperature of the fuel flow Q to be raised to a primary temperature T1. Preferably, since the fuel flow Q has a saturation temperature Ts at the first pressure P1, the primary temperature T1 is lower than the saturation temperature Ts at the first pressure P1. In this example, wherein the fuel Q is liquid hydrogen, the saturation temperature Ts is between −253° C. (20K) and −250° C. (23K).

The first mechanical pump 21 thus allows a sub-cooling of the fuel flow Q, which at the first pressure P1 ensures that the fuel flow Q does not reach liquid saturation, as is the case at the outlet of the cryogenic tank R. For example, at the outlet of the first mechanical pump 21, the fuel flow Q is at a temperature of −251° C. (22.6K) at a pressure of 5 bar. At this pressure, the saturation temperature Ts of hydrogen is −246° C. (27K). The first mechanical pump 21 thus ensures that the fuel Q is in a liquid state at the outlet of the first mechanical pump 21 and that no vapor particles are likely to enter the second mechanical pump 22.

Preferably, the first mechanical pump 21 is a pump adapted to accept as input a fuel mixture at liquid saturation at the outlet of the tank R.

According to the invention, as shown in FIG. 2, the conditioning system SC comprises a second mechanical pump 22, mounted in the fuel circuit 1 downstream of the first mechanical pump 21. The second mechanical pump 22 corresponds to the main pump of the fuel circuit 1 and is configured to circulate the fuel flow Q from upstream to downstream in the fuel circuit 1. The second mechanical pump 22 is configured to raise the pressure of the main fuel flow Qp in the fuel circuit 1 to a second pressure P2, higher than the first pressure P1. In this example, the second pressure P2 is between 8 and 60 bar.

Still referring to FIG. 2, the conditioning system SC comprises a first heat exchanger 31, mounted in the fuel circuit 1, configured to transmit calories to the fuel flow Q so as to warm it so that it may be injected optimally into the turbine engine M.

The first heat exchanger 31 is a fuel/fuel type exchanger, as it allows a cold fuel flow to be heated by a hot fuel flow that has been previously warmed, as will be described in more detail below. More specifically, the first heat exchanger 31 is configured to warm the fuel flow Q by means of a recirculated warmed fuel flow Q2, as will be described in more detail later. Preferably, in the first heat exchanger 31, the fuel flow Q and the recirculated fuel flow Q2 circulate in opposite directions. It goes without saying that the flows could circulate in similar directions. The use of a fuel/fuel type exchanger advantageously avoids any risk of icing/solidification of a heat transfer fluid.

In this example, the first heat exchanger 31 is a tubular or plate heat exchanger. The heat exchange surfaces in the first heat exchanger 31 comprise, in one embodiment, additional exchange members, such as fins for example, in order to improve the overall aerothermal performance of the heat exchanger.

Preferably, the first heat exchanger 31 is mounted, in the fuel circuit 1, in the aircraft reference frame REF-A, i.e.

close to the cryogenic tank R, downstream of the first mechanical pump 21. The first heat exchanger 31 comprises a fuel inlet 31E, shown in FIG. 2.

The first heat exchanger 31 is configured to heat the fuel flow Q to a circulation temperature Tc, higher than the primary temperature T1 and at the vaporization temperature of the fuel Q. In this example, for hydrogen, the circulation temperature Tc is greater than −208° C. (65K), preferably between −173 and −123° C. (100 and 150K). Thus the fuel flow Q at the outlet (i.e. downstream) of the first heat exchanger 31 is only in the gaseous state.

The first heat exchanger 31 allows, in the aircraft reference frame REF-A, to warm the fuel flow Q before it circulates to the turbine engine reference frame REF-M, which allows to dispense with the use of special pipes which would comprise a specific insulation to withstand the temperatures of a cryogenic fuel Q, between the first heat exchanger 31 (in the aircraft reference frame REF-A) and the second heat exchanger 32 (mounted in the turbine engine reference frame REF-M).

The first heat exchanger 31 also allows to reduce the temperature of the recirculated fuel flow Q2 (as will be described in more detail later) so that it may reach the vicinity of the tank R while complying with the aircraft manufacturer's safety recommendations, which impose a fluid temperature below a predetermined maximum temperature Tmax.

According to the invention, the conditioning system SC comprises a distribution valve 4, mounted in the fuel circuit 1 downstream of the first heat exchanger 31, in the turbine engine reference frame REF-M.

In a first embodiment, shown in FIG. 2, the distribution valve 4 is mounted downstream of a second heat exchanger 32, which will be described in more detail later. In a second embodiment, shown in FIG. 3, the distribution valve 4 is mounted in the fuel circuit 1 directly downstream of the first heat exchanger 31.

For the sake of clarity, the fuel flow Q upstream of the distribution valve 4 will hereafter be referred to as the "main fuel flow Qp".

According to the invention, the distribution valve 4 is configured to divide the fuel circuit 1 into a supply branch 11 mounted between the distribution valve 4 and the turbine engine M and a recirculation branch 12 mounted between the distribution valve 4 and the fuel inlet 31E of the first heat exchanger 31 via said first heat exchanger 31. Also, as shown in FIG. 2, the distribution valve 4 is configured to divide the main fuel flow Qp into:

a direct fuel flow Q1 configured to circulate in the supply branch 11 and supply the turbine engine M, and
a recirculated fuel flow Q2, configured to circulate in the recirculation branch 12.

By means of the distribution valve 4 and the recirculation branch 12, the main fuel flow Qp is warmed in the first heat exchanger 31 to the circulation temperature Tc by means of the recirculated fuel flow Q2, the temperature of which will have been previously raised, as will be described in more detail later. Thus, only a fraction of the main fuel flow Qp is redirected, from the turbine engine reference frame REF-M towards the aircraft reference frame REF-A, towards the first heat exchanger 31, allowing the rest of the main fuel flow Qp to be conveyed directly into the turbine engine M.

In a preferred embodiment, with the direct fuel flow Q1 having a first flow rate d1 and the recirculated fuel flow Q2 having a second flow rate d2, the second flow rate d2 is between 5% and 25% of the first flow rate d1 of the direct fuel flow Q1.

Preferably, the recirculation branch 12 opens into the fuel circuit 1 between the two mechanical pumps 21, 22.

Figures 3, 4:
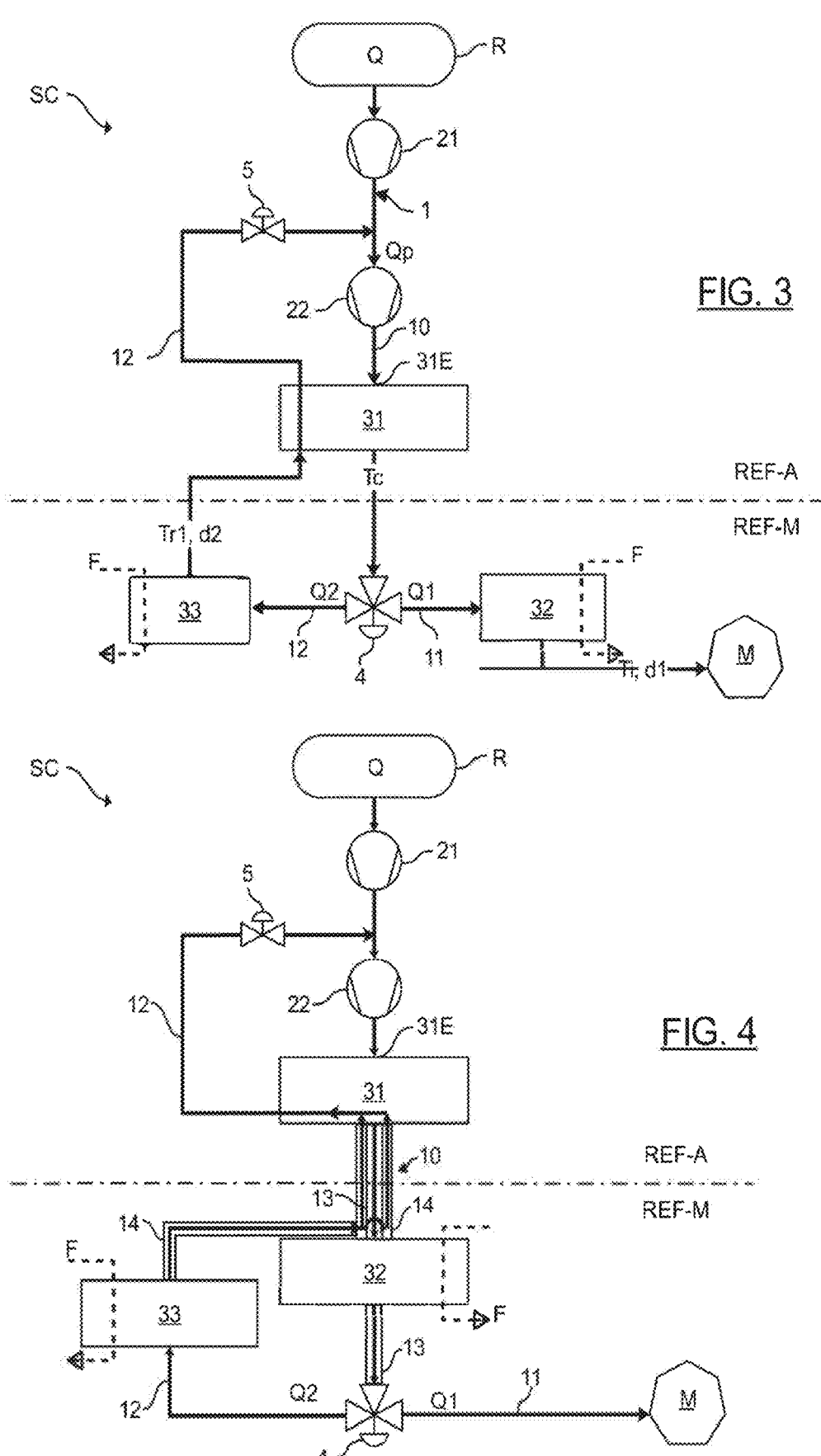
FIG. 3 is a schematic representation of a conditioning system according to a second embodiment of the invention.
FIG. 4 is a schematic representation of a conditioning system comprising a fuel circuit comprising a double wall.

As shown in FIGS. 2 and 3, the conditioning system SC according to the invention also comprises a second heat exchanger 32, mounted downstream of the first heat exchanger 31, in the turbine engine reference frame REF-M. The second heat exchanger 32 is preferably a heat exchanger wherein a heat transfer fluid F circulates to provide calories to the fuel flow Q, which is in the gaseous state. The heat transfer fluid F therefore presents no risk of icing, as the fuel flow Q is in the gaseous state at a temperature above the vaporization temperature.

In this example, the heat transfer fluid F may be of different types, for example a gas or a liquid, in particular air, oil from the turbine engine M, hot gases from the low-pressure turbine outlet, carbon dioxide or nitrogen.

In a first embodiment, with reference to FIG. 2, the second heat exchanger 32 is mounted on the fuel circuit 1 between the first heat exchanger 31 and the distribution valve 4. The second heat exchanger 32 is then configured to heat the main fuel flow Qp to an injection temperature Ti, the injection temperature Ti being higher than the circulation temperature Tc. In this example, the injection temperature Ti is between 73 and 127° C. (200 and 400K). The main fuel flow Qp is configured to pass through the distribution valve 4 at the injection temperature Ti. At the outlet of the distribution valve 4, the direct fuel flow Q1, then at the injection temperature Ti, is configured to be conveyed directly into the supply branch 11 to be directed towards the turbine engine M. The recirculated fuel flow Q2, also at the injection temperature Ti, is configured to be conveyed towards the first heat exchanger 31 via the recirculation branch 12.

In a second embodiment, with reference to FIG. 3, the second heat exchanger 32 is mounted on the supply branch 11 of the supply circuit 1. The main fuel flow Qp is configured to pass through the distribution valve 4 at the circulation temperature Tc. At the outlet of the distribution valve 4, the direct fuel flow Q1, then at the circulation temperature Tc, is configured to be conveyed, via the supply branch 11, into the second heat exchanger 32, itself configured to heat the direct fuel flow Q1 to the injection temperature Ti. The recirculated fuel flow Q2, at circulation temperature Tc, is configured to be conveyed into the recirculation branch 12.

This type of embodiment allows the temperature in the supply branch 11 and the temperature in the recirculation branch 12 to be adjusted independently, which is advantageous for optimizing the conditioning system according to the operating conditions.

In this embodiment, still with reference to FIG. 3, the conditioning system SC preferably comprises a third heat exchanger 33, mounted on the recirculation branch 12 between the distribution valve 4 and the first heat exchanger 31. The third heat exchanger 33 may be mounted either in the turbine engine reference frame REF-M or in the aircraft reference frame REF-A.

The third heat exchanger 33 is configured to warm the recirculated fuel flow Q2 to a first recirculation temperature Tr1, greater than or equal to the injection temperature Ti, by means of a heat transfer fluid F. Such a first recirculation temperature Tr1 allows to effectively warm the main fuel flow Qp in the first heat exchanger 31 by transferring sufficient calories to it so that it heats up to the circulation temperature Tc and is only in the gaseous state at the outlet of the first heat exchanger 31. In this example, the first recirculation temperature Tr1 is between 77 and 227° C. (350 and 500K).

After passing through the first heat exchanger 31 and transferring calories to the main fuel flow Qp, the recirculated fuel flow Q2 is configured to be cooled to a second recirculation temperature Tr2. In this example, the second recirculation temperature Tr2 is between –238 and –223° C. (35 and 50K). The recirculated fuel flow Q2 is configured so that, at the outlet of the first heat exchanger 31, after having warmed the main fuel flow Qp, it is mixed with the main fuel flow Qp, upstream of the first heat exchanger 31, so as to warm it to a mixing temperature Tm, as will be described in more detail later. Preferably, the mixing temperature Tm, which is higher than the primary temperature T1, ensures that the mixture between the recirculated fuel flow Q2 and the main fuel flow Qp is in a liquid state. In this example, the mixing temperature Tm is between –247 and –238° C. (26 and 35K).

In the embodiment wherein the second heat exchanger 32 is mounted between the first heat exchanger 31 and the distribution valve 4, as shown in FIG. 2, the conditioning system SC also preferably comprises a third heat exchanger 33 mounted in the recirculation branch 12 between the distribution valve 4 and the first heat exchanger 31. The third heat exchanger 33 is then configured to warm the recirculated fuel flow Q2 at the injection temperature Ti to the first recirculation temperature Tr1, which is higher than the injection temperature Ti.

In a preferred embodiment, as shown in FIG. 4, the conditioning system SC comprises an expansion valve 5 mounted in the recirculation branch 12, preferably between the first heat exchanger 31 and the fuel circuit 1. The expansion valve 5 allows the recirculated fuel flow Q2 to be expanded to the first outlet pressure P1 of the first mechanical pump 21, so that the recirculated fuel flow Q2 may be mixed with the main fuel flow Qp from the cryogenic tank R. The recirculated fuel flow Q2 is thus in the liquid state at the outlet of the expansion valve 5.

Preferably, the expansion valve 5 is an isenthalpic Joule-Thomson expansion valve.

The fuel circuit 1 comprises interface ducts 10 for switching from one reference frame to another, as shown in FIG. 3.

Figure 5:
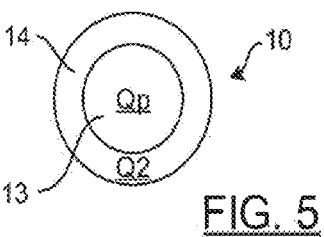
FIG. 5 is a cross-sectional view of the double-walled fuel circuit of FIG. 4, in a first embodiment.
Figure 6:
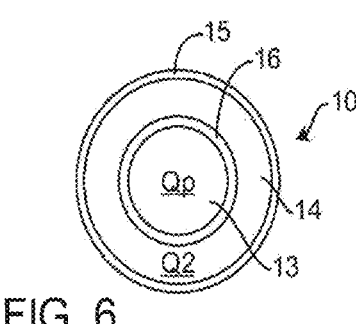
FIG. 6 is a cross-sectional view of the double-walled fuel circuit shown in FIG. 4, in a second embodiment.

In one embodiment, with reference to FIGS. 4 to 6, a first interface duct 13 is formed by the duct connecting the first heat exchanger 31 of the aircraft reference frame REF-A to the distribution valve 4 of the turbine engine reference frame REF-M. A second interface duct 14 is formed by the duct connecting the third heat exchanger 33 of the turbine engine reference frame REF-M to the first heat exchanger 31 of the aircraft reference frame REF-A.

Preferably, the first interface duct 13 and the second interface duct 14 are each in the form of a cylinder and are concentric, as shown in FIGS. 5 and 6. Even more preferably, the second annular duct 14 extends radially outside the first duct 13 so as to form a double-walled pipe and to warm the main fuel flow Qp downstream of the first heat exchanger 31, as far as the distribution valve 4 (or as far as the second heat exchanger 32, depending on their positions), by the recirculated fuel flow Q2.

Preferably, as shown in FIG. 4, the main fuel flow Qp and the recirculated fuel flow Q2 circulate through the ducts in opposite directions.

In one embodiment, the common surface between the two ducts 13, 14 comprises grooves or fins (not shown) to promote heat exchange between the two flows of fuel Qp, Q2.

In one embodiment, the external wall of the second duct 14 comprises a multi-layer insulation to minimize heat loss.

In one embodiment, with reference to FIG. 6, the fuel circuit 1 comprises a third duct 15, mounted radially externally to the second duct 14. Preferably, the third duct 15 is configured to be placed under vacuum and to detect a change in pressure, so as to detect a leak in the recirculated fuel flow Q2 and/or the main fuel flow Qp.

In one embodiment, the fuel circuit 1 comprises an intermediate duct 16, mounted between the first duct 13 and the second duct 14. The intermediate duct 16 is preferably placed under vacuum, so as to allow the detection of a leak in the main fuel flow Qp and/or the recirculated fuel flow Q2. Preferably, the exchange surfaces between the first duct 13, respectively the second duct 14, and the intermediate duct 16 comprise fins (not shown), so as to make it easy to detect a leak between the two flows Qp, Q2 while ensuring heat exchange between the hot recirculated fuel flow Q2 and the cold main fuel flow Qp.

In one embodiment, the conditioning system SC comprises a high-pressure exchanger (not shown), mounted in the fuel circuit 1 directly downstream of the first heat module 31. Preferably, the high-pressure heat exchanger is mounted in the aircraft reference frame REF-A so as to recover heat from the aircraft, e.g. cabin exhaust air, thermal rejects from on-board electrical and electronic components, etc. The high-pressure heat exchanger allows to optimize the use of heat sources on board the aircraft.

In one embodiment of the invention, the conditioning system SC comprises a recirculation valve (not shown) mounted in the fuel circuit 1. In one embodiment, the recirculation valve is mounted downstream of the cryogenic tank R and allows the fuel flow Q to be recirculated into the cryogenic tank R, for example in the event of a low flow rate. A low flow rate may lead to an instability of the first mechanical pump 31, which is undesirable. Similarly, the recirculation valve may be mounted so as to allow a recirculation of the fuel flow Q in the second mechanical pump 22. This increases the flow rate of the fuel flow Q.

Figure 7:
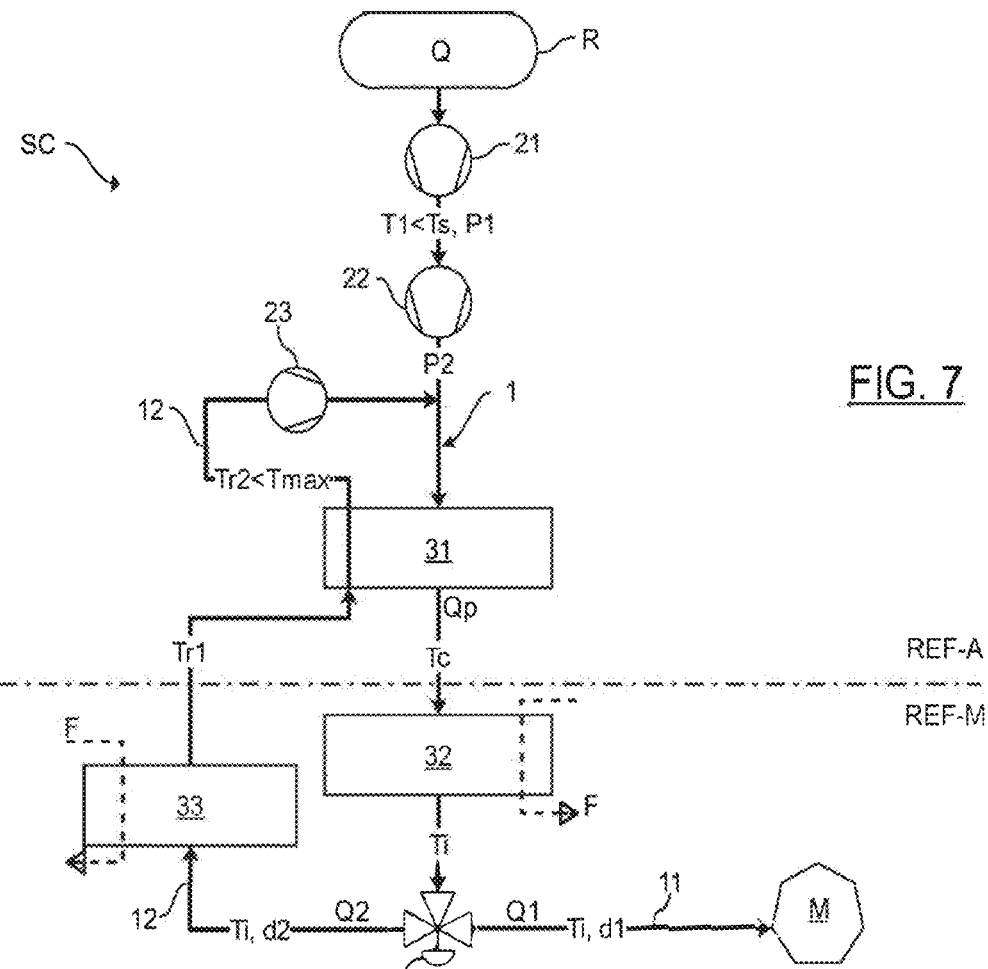
FIG. 7 is a schematic representation of a conditioning system according to a third embodiment of the invention.

In one embodiment, with reference to FIG. 7, the conditioning system SC comprises a third mechanical pump 23 mounted in the recirculation branch 12 between the first heat exchanger 31 and the fuel circuit 1. The third mechanical pump allows to ensure that the recirculated fuel flow Q2 circulates in the recirculation branch 12 and mixes with the main fuel flow Qp, even at low flow rates. In this embodiment, the recirculation branch 12 preferably opens into the fuel circuit 1 between the second mechanical pump 22 and the first heat exchanger 31. Preferably, the recirculated fuel flow Q2 is thus configured so that it leaves the third mechanical pump 33 at the pressure P2 corresponding to the pressure of the main fuel flow Qp leaving the second mechanical pump 22 on the fuel circuit 1.

Figure 8:
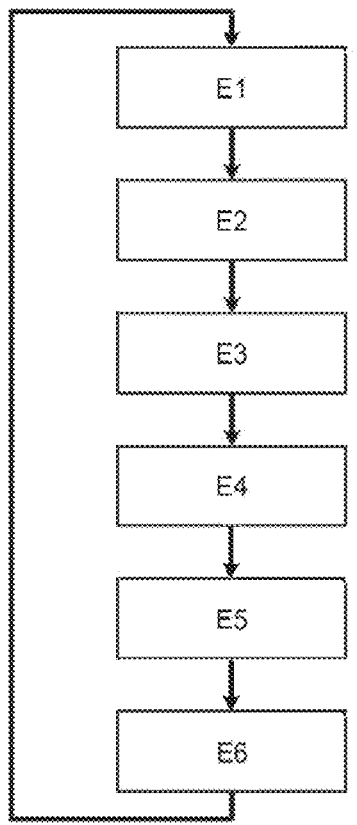
FIG. 8 is a diagram of the steps in a fuel supply method according to one embodiment of the invention.

A method for supplying fuel to a turbine engine M according to an embodiment of the invention will now be presented, with reference to FIG. 2 and FIG. 8. In this example, the first mechanical pump 21 allows the fuel flow Q to be entirely in the liquid state at the inlet of the second mechanical pump 22. The second mechanical pump 22 circulates the fuel flow Q from the cryogenic tank R in the fuel circuit 1 to the turbine engine M. In this example of embodiment, the fuel Q is dihydrogen and is stored in the liquid state in the cryogenic tank R. The fuel Q is initially at a temperature of between −248 and −243° C. (between 25 and 30 K). The heat transfer fluid F circulating in the second heat exchanger 32 and the third heat exchanger 33 is nitrogen.

The method comprises a first step E1 of heating the main fuel flow Qp in the first heat exchanger 31 to at least the circulation temperature Tc, in this example between −173° C. (100K) and −123° C. (150K). Such heating is carried out in the aircraft reference frame REF-A, as close as possible to the cryogenic tank R.

The main fuel flow Qp is in the gaseous state downstream of the first heat exchanger 31 and then circulates, in a second step E2, in the first interface duct 13 of the fuel circuit 1, from the aircraft reference frame REF-A to the turbine engine reference frame REF-M.

The main fuel flow Qp is then, in this example, heated in the second heat exchanger 32 by the heat transfer fluid F. to the injection temperature Ti, in this example between −23° C. (250K) and 27° C. (300K).

At the outlet of the second heat exchanger 32, the main fuel flow Qp at injection temperature Ti then passes through the distribution valve 4 and is divided, in a step E3, into a direct fuel flow Q1 and a recirculated fuel flow Q2.

In a fourth step E4, the direct fuel flow Q1 is conveyed via the supply branch 11 to the turbine engine M to supply it. In this same step, the recirculated fuel flow Q2 circulates in the recirculation branch 12 and passes, in this example, through the third heat exchanger 33 to be heated to the first recirculation temperature Tr1, in this example higher than the injection temperature Ti and between 77° C. (350K) and 227° C. (500K). The recirculated fuel flow Q2 is then conveyed, via the recirculation branch 12, to the aircraft reference frame REF-A, where it is introduced into the first heat exchanger 31, in a step E5, to warm the main fuel flow Qp to the circulation temperature Tc.

The recirculated fuel flow Q2, whose temperature at the outlet of the first heat exchanger 31 has dropped to the second recirculation temperature Tr2 (in this example between −238° C. (35K) and −223° C. (50K)) is then conveyed, in a step E6, upstream of the first heat exchanger 31 to be mixed with the main fuel flow Qp. The mixture of main fuel flow Qp and recirculated fuel flow Q2, at the mixing temperature Tm of, in this example, between −247° C. (26 K) and −238° C. (35 K), is then introduced into the first heat exchanger 31, to be heated to the circulation temperature Tc.

The supply method allows the main fuel flow to be heated by a fraction of the fuel flow heated to injection temperature. The first heat exchanger, mounted in the aircraft reference frame, ensures that the fuel flow is at a sufficiently high temperature to be in a gaseous state, thereby eliminating the need for piping comprising a specific insulation.

The invention claimed is:

1. A fuel conditioning system configured to supply an aircraft turbine engine with fuel from a cryogenic tank, the conditioning system being defined in an aircraft reference frame and a turbine engine reference frame, the cryogenic tank extending in the aircraft reference frame and the turbine engine extending in the turbine engine reference frame, the conditioning system comprising:

a fuel circuit connected at an inlet to the cryogenic tank and at an outlet to the turbine engine, a main fuel flow circulating from upstream to downstream in the fuel circuit, at least one first mechanical pump mounted on the fuel circuit in the aircraft reference frame, the at least one first mechanical pump being configured to raise a pressure of the main fuel flow in the fuel circuit to a first pressure, at least one first heat exchanger mounted downstream of the at least one first mechanical pump, the at least one first heat exchanger being configured to heat the main fuel flow to a circulation temperature, the at least one first heat exchanger being mounted in the aircraft reference frame, the at least one first heat exchanger comprising a fuel inlet, at least one second mechanical pump, mounted on the fuel circuit between the at least one first mechanical pump and the at least one first heat exchanger, the at least one second mechanical pump being configured to circulate the main fuel flow from the cryogenic tank from upstream to downstream in the fuel circuit, the at least one second mechanical pump being configured to raise a pressure of the main fuel flow in the fuel circuit to a second pressure higher than the first pressure, at least one second heat exchanger configured to heat the main fuel flow to a temperature equal to or greater than an injection temperature, the injection temperature being higher than the circulation temperature, the at least one second heat exchanger being mounted in the turbine engine reference frame, and a distribution valve mounted on the fuel circuit downstream of the at least one first heat exchanger in the turbine engine reference frame the distribution valve being configured to divide the fuel circuit into:

a supply branch mounted between the distribution valve and the turbine engine, and a recirculation branch mounted between the distribution valve and a location between the at least one first and second mechanical pumps and passing through the first heat exchanger, wherein the distribution valve being configured to divide the main fuel flow into a direct fuel flow configured to circulate in the supply branch and supply the turbine engine, and a recirculated fuel flow, configured to circulate in the recirculation branch to warm the main fuel flow in the at least one first heat exchanger to the circulation temperature via the recirculated fuel flow being at a temperature greater than or equal to the injection temperature.

2. The conditioning system according to claim 1, wherein the distribution valve is mounted downstream of the second heat exchanger.

3. The conditioning system according to claim 1, wherein, the direct fuel flow circulating in the supply branch having a first flow rate, the recirculated fuel flow circulating in the recirculation branch having a second flow rate of between 5% and 25% of the first flow rate of the direct fuel flow.

4. The conditioning system according to claim 1, wherein, the first pressure of the main fuel flow allowing the temperature of the main fuel flow to be raised to a primary temperature, the fuel flow having a saturation temperature at the first pressure, the primary temperature is lower than the saturation temperature at the first pressure.

5. The conditioning system according to claim 1, comprising a third heat exchanger mounted on the recirculation branch to increase a temperature of the recirculated fuel flow above the injection temperature, the third heat exchanger being mounted in the turbine engine reference frame.

6. The conditioning system according to claim 1, comprising an expansion valve mounted on the recirculation branch to have the recirculated fuel flow circulating in the recirculation branch having a pressure substantially equal to a pressure of the fuel flow on the fuel circuit between the first mechanical pump and the first heat exchanger.

7. The conditioning system according to claim 1, wherein the fuel circuit between the first heat exchanger and the second heat exchanger comprises a first duct for circulation of the main fuel flow and a second duct for circulation of the recirculated fuel flow, the first duct and the second duct each being in the form of a cylinder, the first duct and the second duct being concentric, the second duct extending radially outside the first duct, so as to warm the main fuel flow at an outlet of the first heat exchanger by the recirculated fuel flow.

8. The conditioning system according to claim 1, comprising a third mechanical pump, mounted on the recirculation branch, the third mechanical pump being configured to circulate the recirculated fuel flow in the recirculation branch from the distribution valve to the fuel circuit.

9. An aircraft comprising the cryogenic tank, the turbine engine and the conditioning system according claim 1.

10. A method for supplying the fuel to the aircraft turbine engine via the conditioning system according to claim 1, the method comprising:

heating the main fuel flow, in the first heat exchanger in the aircraft reference frame, to at least the circulation temperature, conveying the main fuel flow towards the turbine engine reference frame, dividing the main fuel flow into the direct fuel flow and the recirculated fuel flow, and directing the recirculated fuel flow towards the first heat exchanger, so that the first heat exchanger collects calories from the recirculated fuel flow having a temperature of at least the injection temperature to warm the main fuel flow up to the circulation temperature.

11. The conditioning system according to claim 1, wherein the recirculated fuel flow circulating in the recirculation branch has a same pressure as the fuel flow on the fuel circuit between the first mechanical pump and the first heat exchanger.

* * * * *